United States Patent Office 3,692,719
Patented Sept. 19, 1972

1

3,692,719
DELAYED ACTION VULCANIZATION
ACCELERATOR SYSTEM
Raymond C. Srail, Parma, and Ray D. Taylor, Brecksville, Ohio, assignors to The B. F. Goodrich Company, New York, N.Y.
No Drawing. Filed Dec. 10, 1970, Ser. No. 96,926
Int. Cl. C08d 13/28
U.S. Cl. 260—23.5 A          18 Claims

ABSTRACT OF THE DISCLOSURE

A useful delayed action vulcanization accelerator system is obtained when polythiocarbonates and amine- or imine-blocked isocyanates are incorporated in unsaturated rubber compositions. These accelerator systems have the advantage of being stable during processing therefore minimizing scorch of the rubber but upon increasing the temperature for vulcanization the accelerator is formed so that very rapid cures are achieved.

BACKGROUND OF THE INVENTION

Numerous vulcanization accelerators are available for use with a wide variety of rubbers. These accelerators are capable of reducing both the time and temperature of vulcanization so that increased output of the vulcanizing equipment is obtained. The presently known accelerator systems are not without their disadvantages however. Dithiocarbamates, the so-called ultra-accelerators, develop very rapid cures at vulcanization temperatures but are so active that the heat required for processing (mixing, forming, etc.) is sufficient to bring about vulcanization, the rubber being said to scorch. With the sulfenamides, the so-called delayed action accelerators, the rubber is less scorchy but the cure rates are drastically reduced. In other words, presently known accelerators give scorch characteristics which are fairly proportional to the cure rate.

It would be highly advantageous to have a means for accelerating vulcanization of rubbers while maintaining feasible scorch times. Ideally the system (rubber+curatives+accelerator) would be kinetically inactive, or essentially so, at temperatures of the order required for processing but would become kinetically active and develop very rapid cures as the temperature was increased. This would permit ready processing of the rubber stock for extended periods via milling, banburying, extruding, etc., with no sacrifice in physical properties of the resulting vulcanized rubber composition.

To achieve such a "delayed action" effect it has been suggested that the accelerator be "tied-up" in a form so that it is not released for vulcanization until a certain temperature is reached. U.S. Pat. 1,511,984 teaches the addition of an accelerating agent absorbed on the surface of activated carbon to rubber. U.S. Pat. 1,560,465 discloses the various constituents required to produce a vulcanization accelerator separately absorbed on activated carbon and added to the rubber. Barium trithiocarbonate, which decomposes under heat to liberate carbon disulfide, and an amine capable of forming a dithiocarbamate have also been added to rubber with sulfur and zinc oxide to achieve vulcanization. These known delayed action accelerator systems are not completely acceptable since they tend to release the accelerator or active accelerator constituents at temperatures normally employed for processing, thus resulting in a scorchy rubber. This problem of scorch is ever increasing since the trend throughout the industry is to increase processing temperatures to obtain greater outputs.

2

It would be most desirable to have an accelerator system wherein the active constituents are not released for formation of the active accelerating agent at processing temperatures even up to about 260° F. When the temperature is raised for vulcanization the various constituents would be released to form the accelerating agent so that rapid cures would be obtained. It would be even more advantageous if the accelerator constituents could be formulated or modified so that the temperature at which the active constituents are released could be varied since all rubbers do not have the same processing and vulcanization requirements. It would be even more advantageous if one of the accelerator constituents, in addition to releasing an active ingredient for the formation of the accelerating agent, would also function as a sulfur donor.

SUMMARY OF THE INVENTION

These and other advantages are realized by the present invention wherein a polythiocarbonate and an amine- or imine-blocked isocyanate are added to a vulcanizable rubber to accelerate the cure while maintaining acceptable scorch times. It has unexpectedly been found that the present accelerator system is essentially inactive at temperatures employed for processing of the rubber but as the temperature is increased for vulcanization, carbon disulfide and amine or imine are released and react "in situ" to form the active accelerator component, a dithiocarbamate. The polythiocarbonate donates the carbon disulfide while the amine- or imine-blocked isocyanate releases the amine or imine. Employing this approach the active accelerator is not made available in the rubber until vulcanization temperatures are achieved.

In accordance with the present invention a rubber containing from 0.5% to about 50% by weight olefinic unsaturation based on the overall polymer composition is compounded with a polythiocarbonate having the general formula $(CS_{2+n})_x$, wherein $n$ is a number from 0 to 5 and $x$ is a number from about 4 to 100, and an adduct formed by the reaction of an isocyanate with a secondary amine or imine. The total weight of the accelerator system present in the rubber will range between about 1 to 8 parts based on 100 parts of the rubber. The mol ratio of amine (imine) to carbon disulfide will range from about 0.5:1 to about 2:1 and is most preferably about 1:1. A source of zinc such as zinc oxide or a zinc salt of a fatty acid is also included with the polythiocarbonate and amine- or imine-blocked isocyanate.

It has additionally been found that with polythiocarbonates having $n$ greater than 0 acceptable cures are obtained without the addition of elemental sulfur or other curing additives. About 20% to 70% by weight of these polythiocarbonates may be available sulfur for vulcanization purposes. The total sulfur from any source to achieve acceptable vulcanization will range from about 0.3 to 6 parts by weight per 100 parts of the rubber.

DETAILED DESCRIPTION

The present vulcanization accelerator system is effective for use with any rubber composition capable of being cured employing a conventional sulfur cure system. Such rubber compositions contain olefinic unsaturation $$(>C=C<)$$

constituting about 0.5% to about 50% by weight of the overall polymer composition. Rubber compositions for which this accelerator system is useful include both natural rubbers and synthetic rubbers obtained by the polymerization of a variety of monomers.

The present vulcanization accelerator system is especially effective for use with polymers derived from conjugated diolefins. Conjugated diolefins employed will typically contain from 4 to 6 carbon atoms and include: 1,3-butadiene, isoprene, piperylene, 2,3-dimethylbutadiene-1,3 and the 2-methylpentadiene-1,3. Typically the conjugated diolefin will constitute from about 30% to 100% by weight of the polymer composition. Homopolymers of butadiene and isoprene wherein the polymer contains about 80% or more of the 1,4-addition product are an especially useful class of rubber compositions. This accelerator system is even more significant for use with stereoregular rubbers derived from conjugated diolefins wherein the polymer compositions are comprised of between 95% and 100% of the 1,4-addition product which has predominantly one stereo configuration (cis or trans). These stereoregular rubbers may be produced by any conventional known method such as polymerization with lithium-based catalysts or Ziegler catalysts. Typical synthetic rubber compositions for which the present vulcanization accelerators are useful include: synthetic natural rubber (cis-polyisoprene); trans-polyisoprene; polybutadiene; chloroprene polymers (Neoprenes); butyl rubbers (copolymers of isobutylene and isoprene); GR-S rubber (copolymers of styrene and butadiene); nitrile rubbers (copolymers of butadiene and acrylonitrile); copolymers of conjugated diolefins with lower alkyl acrylates or lower alkyl methacrylates; and the like.

Another especially useful class of olefinically unsaturated polymers for the present invention are the ethylene-propylene-diene terpolymers and ethylene-butene-diene terpolymers. With these rubbers the diene monomer contains multiple unsaturation and thus provides the necessary unsaturation in the polymer composition for sulfur cure. Useful diene monomers include 1,4-hexadiene, methyl-1,4-hexadiene, 1,4,9-decatriene, the dimethyl-1,4, 9-decatrienes, dicyclopentadiene, vinylcyclohexene, vinylnorbornene, ethylidenenorbornene, methylenenorbornene, methylnorbornadiene, methyltetrahydroindene and the like. These polymer compositions will typically contain about 0.3% to 10% by weight of the diene monomer polymerized with about 30% to 80% by weight ethylene and 20% to 70% propylene or butene-1.

In addition to the above-mentioned preferred rubber compositions for which the present vulcanization accelerators are especially effective to obtain rapid cure with minimal scorch, other polymers such as polyoctenomers and polypentenomers, silicone rubbers, thiokols, polyacrylate rubbers and other related compositions may be effectively employed and are within the scope of the present invention. The only requirement is that the rubber be capable of sulfur cure, that is, forming sulfur cross-links with unsaturation present in the polymer backbone or on a group pendant to the polymer backbone.

The present vulcanization accelerator system is comprised of two compounds neither one of which will be a practical accelerator in the absence of the other. These compounds are essentially inactive at temperatures encountered during processing but when the temperature is increased to achieve vulcanization they release active constituents which form the accelerator. In accordance with the present invention this result is achieved by the use of a polythiocarbonate compound with an imine- or amine-blocked isocyanate. At temperatures encountered during the vulcanization the polythiocarbonate releases carbon disulfide and in some instances sulfur while the imine- or amine-blocked isocyanate will release an imine or amine. The carbon disulfide and imine or amine in turn react "in situ" to form a dithiocarbamate accelerator.

One of the compounds employed for the present invention is a thiocarbonate polymer. These polythiocarbonates degrade upon exposure to heat during vulcanization to liberate carbon disulfide and, depending on the polymer structure, sulfur. The polythiocarbonates correspond to the general formula $(CS_{2+n})_x$ wherein $n$ is a number, either fractional or whole, from about 0 to 5 and $x$ is a number ranging from about 4 to 100 or more.

For example, in the preceding formula when $n$ is 0.5 the polythiocarbonate will have repeating units

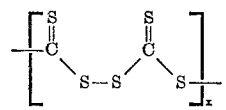

while polythiocarbonates of the formula $(CS_3)_x$ have the structure

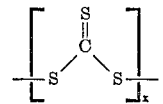

The various polythiocarbonates are obtained by any one of a number of processes including the reaction of equimolar amounts of $SC(SH)_2$ and bromine in a suitable solvent as described by D. Krebs et al., Z. Anorg. Affig. Chem., 338, 225 (1965) or by the reaction of equimolar amounts of an alkali or alkaline earth metal trithiocarbonate with halogen at a controlled pH. The particular process employed to obtain the thiocarbonate polymer is not crucial and may be varied in order to obtain polythiocarbonate compositions having varied molecular weights and/or different repeating units. Accordingly, a wide variety of chemical reactions are available to obtain useful polythiocarbonates in accordance with well-established chemical principles and are within the scope of the present invention.

From the structural formulas set forth above it is evident that by varying the polythiocarbonate composition an amount of sulfur may also be released during vulcanization in addition to the carbon disulfide. It is therefore possible to cure the rubbers without the use of elemental sulfur or any curing additive other than the polythiocarbonate. For example, if the polythiocarbonate employed is polytrithiocarbonate ($n=1$) the decomposition would be according to the equation:

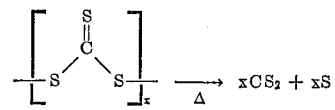

From the equation it is seen that one mol of sulfur is available for cure for each mol of $CS_2$ generated. It is equally evident that by employing polypentathiocarbonate ($n=3$) the amount of available sulfur could be increased (3 mols S/mol $CS_2$). Thus, the present invention is extremely useful since it also provides a means for curing rubber compositions without the addition of elemental sulfur. This is often desirable when improved aging properties are required. Elemental sulfur may, however, be employed with the present accelerator systems without adversely affecting the efficiency of the accelerators. In fact, the addition of elemental sulfur is essential with polythiocarbonates having $n=0$ and is generally felt to be desirable in most other instances also.

To obtain acceptable cures the amount of sulfur available from any source during vulcanization will range from about 0.3 to 6 parts by weight per 100 parts of the rubber. It is generally preferred that the sulfur will be present from about 1 to about 3 parts per 100 parts of the rubber. The amount of sulfur will be varied depending on the temperature of cure, the particular rubber, the cure time and degree of cure desired. When employing the various polythiocarbonate compounds having $n=0$ the amount of elemental sulfur or other sulfur additive required in order to obtain an acceptable cure will be determined, as a practical matter, from a consideration of the optimum physical properties. In general, about 20% to 70% by weight of the polythiocarbonate is available sulfur for vulcanization purposes. With the preferred $(CS_3)_x$ to $(CS_5)_x$ compositions about 30% to 60% by weight is available sulfur. It has generally been found that when a portion or all of the sulfur is supplied by the polythiocarbonate more efficient crosslinking is obtained as compared with an equal amount of elemental sulfur.

In addition to the above-mentioned polythiocarbonate compounds other polymeric compounds containing

molecular groupings as part of the polymer backbone and which decompose at elevated temperatures to split out carbon disulfide can also be employed. Such compounds include polymeric materials of the type

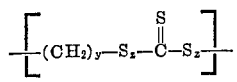

and

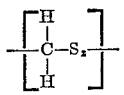

wherein $y$ and $z$ are integers up to about 8. However, since polythiocarbonates release only $CS_2$ and possibly $S$ at elevated temperatures with no $H_2S$ or other troublesome fragments being evolved, they are generally preferred for the purposes of the present invention. It may be desirable and advantageous to employ a mixture of one or more polythiocarbonates by themselves or in combination with one of these latter described sulfur-containing polymers to obtain improved cure rates and scorch characteristics.

Used with the polythiocarbonate is one or more amine- or imine-blocked isocyanates which at temperatures of vulcanization respectively release a secondary amine or imine for reaction with the carbon disulfide to form the dithiocarbamate accelerator. The blocked isocyanates (sometimes referred to as substituted ureas) are adducts of an isocyanate with a secondary amine or imine formed according to the equilibrium:

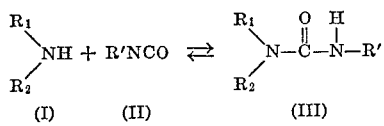

By "tying-up" the amine and imine in the form of compounds of type III the amine or imine is not available for reaction in the rubber during the processing stages but upon increasing the temperature for vulcanization and release of the carbon disulfide the equilibrium is shifted so that the amine or imine is released and becomes available for formation of the dithiocarbamate. By varying the amine or imine and the isocyanate a wide range of adducts exhibiting widely different stabilities, i.e., "unblocking" at different temperatures, are available.

The amine or imine employed for the preparation of the amine-blocked isocyanate and which ultimately is released to form the active dithiocarbamate accelerator corresponds to Formula I wherein $R_1$ and $R_2$ are monovalent hydrocarbon radicals, either the same or different, containing from 1 to 8 carbon atoms or $R_1$ and $R_2$ form a bivalent hydrocarbon radical containing from 2 to 7 carbon atoms or other non-acid bivalent radical containing from 2 to 8 carbon atoms with one or more oxygen, sulfur or nitrogen heteroatoms. Preferred monovalent hydrocarbon radicals are aliphatic radicals, branched or straight chain, containing from 1 to 8 carbon atoms and cycloalkyl groups containing 5 to 8 carbon atoms and include: methyl, ethyl, propyl, butyl, pentyl, hexyl, heptyl, octyl, cyclopentyl, methylcyclopentyl, cyclohexyl, methylcyclohexyl and the like. Useful bivalent radicals include those forming pyridine, piperidine, piperazine, pyrrole, 2-methylpyrrole, pyrazole, imidazole, morpholine, 1,2,3-dioxazole, 1,2,5-oxathiazole, o-isoxazine, p-isoxazine, azepine, indole and like groups with the nitrogen atom.

Reacted with the amine or imine to form the useful adduct (III) is an isocyanate of the formula R'NCO wherein R' is an aryl radical or an alkyl radical containing from 4 to 18 carbon atoms. The aryl and alkyl groups may contain additional isocyanate functions or other substitution so that the isocyanate compound may be a di-, tri- or polyisocyanate.

The efficiency of the accelerating agents of the present invention is not related to the number of isocyanate groups per molecule but is more dependent on the particular type of isocyanate employed. In general, the number of isocyanate groups will only serve to change the stoichiometry of the accelerator components employed. For example, if an adduct derived from a diisocyanate is employed two mols of amine per mol of isocyanate will be used to form the adduct and consequently during vulcanization two mols of the amine will be available for reaction with the carbon disulfide. It is not necessary that all the isocyanate functionality be tied up in the form of the adduct, however, from an economic standpoint this is generally preferred.

The organic isocyanates which are reacted with the secondary amines or imines include both aliphatic and aromatic mono-, di- and poly-isocyanates. Such isocyanates include, for example, phenyl isocyanate, parachlorophenyl isocyanate, hexamethylene diisocyanate, octadecyl isocyanate and the more desirable aromatic di- and polyisocyanates including the 2,4-, and 2,6-toluene diisocyanates, naphthalene-1,5-diisocyanate, diphenylmethane-p,p'-diisocyanate, p-phenylene diisocyanate, dichlorodiphenylmethane diisocyanate, dimethyldiphenylether diisocyanates, bitolyl diisocyanate, triphenylmethane triisocyanate, polymethylene polyphenyl isocyanates and the like. Thioisocyanates such as phenylthioisocyanate and the like may also be used to obtain adducts useful for the present invention.

The choice of the particular isocyanate and the amine employed to obtain the amine-blocked isocyanates can be widely varied and will be determined by a consideration of the rubber composition to be cured and the processing and vulcanization temperatures. If, for example, the rubber composition is to be processed at 260° F. the amine-isocyanate adduct should not appreciably break down at or below this 260° F. temperature. An amine-blocked isocyanate which is reasonably stable up to about 270° F. or higher would be selected in this instance. Similarly, if the temperature of vulcanization is to be 350° F. the amine-isocyanate adduct must break down at some temperature below 350° F. in order to be effective. The same general rules governing the selection of the polythiocarbonate compound will be followed.

The total amount of the accelerator components (polythiocarbonate and amine- or imine-blocked isocyanate) in the rubber will range between about 1 to 8 parts per 100 parts of the rubber. More preferably about 2 to 5 parts (total) per 100 parts rubber will be used. The amount of the individual components may be varied over a wide range but as a practical matter will be governed by a determination of the amount of amine or imine and carbon disulfide to be released for reaction during the vulcanization. The mol ratio of the amine or imine to carbon disulfide will range from about 0.5:1 to about 2:1 and in some instances even higher. Excellent results are obtained however when about a 1:1 mol ratio of amine or imine to carbon disulfide is employed with an excess of either component no greater than about 20% based on the theoretical.

To obtain acceptable cure rates with the present accelerator systems there should also be present in the rubber one of the commonly used vulcanization activators. These vulcanization accelerators will typically be a metal oxide or hydroxides or a metal salt. If the activator is not present short scorch times are obtained and there is a marked decrease in cure rate so that optimum vulcanizate properties are not obtained with the rubber. If the activator is introduced in the form of a metal oxide about 1 to 10 parts and more preferably from about 1.5 to 4 parts per 100 parts rubber will be added. When a metal oxide is employed it is desirable and advantageous to also add a fatty acid having a total carbon atom content ranging from 12 to 24 carbon atoms, such as stearic acid. It is felt that by the addition of such fatty acids the metal is solubilized so that it may better participate in the vulcanization. The amount of fatty acid employed will range from about 0.5 to 5 parts per 100 parts of the rubber. While the incorporation of metal oxide and fatty acid as separate entities is generally preferred based on economic considerations, if desired, a preformed metal salt of a fatty acid containing from 12 to 24 carbon atoms such as zinc laurate, zinc palmitate, zinc stearate or the like may be employed. If pre-formed metal are employed they will range from about 0.5 to 5 parts per 100 parts rubber and more preferably from about 0.75 to 2 parts. The metal will generally be a divalent metal such as zinc, cadmium, lead, calcium, copper, iron or the like. Best results are obtained when the metal oxide or metal salt is derived from zinc, cadmium or lead. Zinc oxide and zinc fatty acids are especially useful activators for use with the present activator systems.

The present accelerator systems are useful with a wide variety of rubber compositions which may additionally contain conventional processing aids and oils, fillers, reinforcing agents, extenders, curing additives, cure retarders and modifiers and various stabilizers including antioxidants and antiozonants. Any phenolic stabilizer can be employed in any useful amount. When amine stabilizers are present as antiozonants it is preferred that p-phenylenediamines wherein the amine function is sterically hindered such as N - 1,3 - dimethylbutyl-N'-phenyl-p-phenylenediamine or other sterically hindered amines be employed. When the amine function of the antiozonant is sterically hindered it will not significantly interfere with the in situ reaction forming the dithiocarbamates.

In general, there is no particular order for the addition of the polythiocarbonate and the amine- or imine-blocked isocyanates to the rubber. They may be added in any sequence with the other additives to obtain active vulcanization accelerators. It has been found most convenient to incorporate the amine- or imine-substituted isocyanate into the rubber in a Banbury mixer. The polythiocarbonate will preferably be added at a somewhat lower temperature and is therefore subsequently blended in on a mill. If elemental sulfur is employed for curing it will generally be added after the polythiocarbonate and amine- or imine-blocked isocyanate.

The following examples serve to illustrate the invention more fully but are not intended to limit the scope thereof. In the examples all parts and percentages are reported on a weight basis unless otherwise indicated. Cure and scorch properties were determined with a cone curometer such as described in U.S. Pat. 3,494,172 by measuring the torque (inch-pounds) developed with time (minutes). The data obtained from the resulting cure curves were as follows: Cure time ($T_c$)—the time required to reach 90% of maximum torque ($\tau_{max}$); scorch time ($T_s$)—time required for the torque to increase 2 inch-pounds over the minimum torque ($\tau_{min}$); cure rate ($CR_{max}$) equals $$\frac{\Delta \tau}{\Delta T}$$

determined at a section of the cure curve having maximum slope.

The following abbreviations are employed throughout the examples and tables:

DMA—dimethyl amine
PIP—piperidine
PYR—pyrrolidine
MePIZ—1-methyl piperazine
DBA—dibutyl amine
DHA—dihexyl amine
TDI—toluene diisocyanate
MDI—diphenylmethane-p,p'-diisocyanate
PCI—p-chlorophenyl isocyanate
PPI—polymethylene polyphenyl isocyanate
TPMT—triphenylmethane triisocyanate
ODI—octadecyl isocyanate

EXAMPLE I

A rubber masterbatch was prepared for testing the various accelerator systems. The masterbatch is one typically employed for tread stock and had the following composition:

| Ingredient: | Parts |
|---|---|
| Styrene-butadiene rubber | 65.0 |
| Polybutadiene (98% cis-1,4) | 35.0 |
| Aromatic oil | 40.6 |
| Carbon black | 70.0 |
| Stearic acid | 1.0 |
| Zinc oxide | 2.0 |
| Processing oil | 2.5 |
| Polymeric 2,2,4-trimethyldihydroquinoline | 2.0 |
| N,N'-bis(1-methylheptyl)-p-phenylenediamine | 1.7 |

Employing the above rubber masterbatch a number of delayed-action accelerator systems were evaluated. The polythiocarbonate ($n>2$) employed was obtained by the chlorine oxidation of sodium trithiocarbonate. A variety of blocked isocyanates were employed with the polythiocarbonate at various molar ratios. The isocyanate adduct was mixed into the rubber masterbatch on a mill at a temperature of 150° F.±5° F. The sulfur and polythiocarbonate were then added and milled for 5 minutes at this temperature. About 12 to 15 gram samples were placed in the cone curometer cavity and evaluated over the temperature range 220° F. to 360° F. Torque values were measured and continuously charted and the scorch and cure properties determined and reported in Table I. $\tau_{max}$ and $CR_{max}$ were not calculated and reported in all instances. Also curometer data was not obtained for all samples at all temperatures, however, sufficient data is presented for each sample to demonstrate the crux of the invention.

It is evident from the data presented in Table I that at temperatures typically employed for processing excellent scorch protection of the rubber is obtained. When the temperature is increased for vulcanization very rapid cures are achieved. The data also shows that by proper selection of the blocked isocyanate the delayed-action characteristics of the accelerator system can be varied as desired and as the requirements of the process require.

The advantage of the present accelerator systems is demonstrated by a comparison of Sample H with the Control which contained a well-known commercial accelerator. With sample H it is seen that the time to achieve cure at 360° F. is significantly shorter than for the Control at the same temperature. Therefore, at temperatures employed for vulcanization much improved cure rates are obtained with the present system. However, at 240° F., a typical processing temperature, the scorch time of Sample H is nearly twice that obtained for the Control. Thus a distinct advantage is provided with rubbers containing the accelerator systems of the present invention.

TABLE I

| Sample designation | Polythio-carbonate (pphr.)[1] | Amine-blocked isocyanate (pphr.) | Sulfur (pphr.) | Property | Cone curometer data Temperature | | | | |
|---|---|---|---|---|---|---|---|---|---|
| | | | | | 360° F. | 330° F. | 280° F. | 240° F. | 220° F. |
| A | 1.65 | DMA/TDI (1.32) | 1.65 | $T_c$ $T_s$ | 1.60 0.62 | * * | — 3.8 | — 18.0 | — 64.0 |
| B | 1.65 | DMA/TDI (2.08) | 0.99 | $T_{max.}$ $T_c$ $T_s$ $CR_{max.}$ | 88.0 1.37 0.48 88.4 | — 3.40 0.95 43.5 | — 4.5 9.25 | — 24.0 1.74 | — 65.3 0.79 |
| C | 1.65 | DMA/PCI (2.12) | 0.99 | $T_{max.}$ $T_c$ $T_s$ $CR_{max.}$ | 71.5 1.63 0.60 58.2 | — 3.75 1.35 26.3 | — 4.4 7.36 | — 20.0 1.87 | — 48.5 0.84 |
| D | 1.65 | DMA/MDI (2.68) | 0.99 | $T_{max.}$ $T_c$ $T_s$ $CR_{max.}$ | 85.0 1.72 0.67 61.8 | — 4.80 1.25 22.2 | — 7.8 3.30 | — 44.0 0.35 | — 137.5 0.125 |
| E | 1.65 | DMA/MDI (1.98) | 1.65 | $T_c$ $T_s$ | 2.30 0.82 | * * | — 5.8 | — 2.76 | — * |
| F | 1.65 | DMA/PAPI (2.82) | 0.99 | $T_{max.}$ $T_c$ $T_s$ $CR_{max.}$ | 75.0 2.04 0.85 51.2 | 5.40 1.20 20.0 | — 6.7 4.17 | — 34.0 0.70 | — 86.0 0.34 |
| G | 1.65 | DMA/TPMT (2.64) | 0.99 | $T_{max.}$ $T_c$ $T_s$ $CR_{max.}$ | 70.0 3.30 1.28 26.8 | — 10.0 3.20 8.3 | — 16.4 1.14 | — 84.0 0.14 | — 218.0 0.06 |
| H | 1.65 | PYR/MDI (1.96) | 1.32 | $T_{max.}$ $T_c$ $T_s$ $CR_{max.}$ | 87.0 2.05 0.80 60.0 | 83.0 5.70 1.30 17.2 | — 13.4 2.0 | — 92.0 0.16 | — 249.5 0.035 |
| I | 1.65 | PYR/PAPI (2.03) | 1.32 | $T_{max.}$ $T_c$ $T_s$ $CR_{max.}$ | 87.0 2.40 0.85 50.0 | 82.0 6.90 1.40 15.6 | — 10.6 2.14 | — 69.0 0.19 | — * * |
| J | 1.65 | PIP/TDI (1.72) | 1.65 | $T_c$ $T_s$ | 1.77 0.68 | * * | — 4.0 | — 17.0 | — 58.8 |
| K | 1.65 | PIP/MDI (2.09) | 1.65 | $T_c$ $T_s$ | 2.40 0.85 | * * | — 7.8 | — 43.0 | — * |
| L | 1.65 | MePIZ/MDI (2.22) | 1.65 | $T_c$ $T_s$ | 2.10 0.80 | * * | — 6.4 | — 31.6 | — 119.0 |
| M | 1.65 | DBA/MDI (2.53) | 1.65 | $T_c$ $T_s$ | 2.75 0.65 | * * | — 6.8 | — 43.0 | — * |
| N | 1.65 | DHA/MDI (3.10) | 1.65 | $T_c$ $T_s$ | 2.85 0.65 | * * | — 7.5 | — * | — * |
| Control[2] | None | None | 1.65 | $T_{max.}$ $T_c$ $T_s$ $CR_{max.}$ | 59.4 2.75 1.30 33.9 | — 6.70 2.75 15.9 | — — 12.5 4.42 | — — 50.7 0.94 | — — 96.3 0.48 |

[1] Pphr.=parts per hundred based on the rubber.
[2] The control contained 1.25 pphr. 2-morpholinobenzothiazolesulfenamide commercial accelerator.
— Indicates data not calculated.
*Indicates properties not determined at that temperature.

EXAMPLE II

To demonstrate the additional advantage of the accelerator systems of the present invention, vulcanization was achieved without the use of elemental sulfur. In these systems the only source of sulfur for cure was from the polythiocarbonate which additionally served as one of the accelerator components. The polythiocarbonate (1.72 pphr.) employed had a value for $n$ between about 3 and 4. The amine-blocked isocyanate (1.83 pphr.) was the adduct obtained from dimethyl amine and toluene diisocyanate. Cone curometer data was obtained at temperatures over the range 220° F. to 360° F. At 240° F., for example, the scroch time was 27.2 minutes and even at 280° F. the scorch time was still 5 minutes. Cure times at 330° F. and 360° F. were 2.95 minutes and 1.72 minutes, respectively. The cure rates at the various tempratures were as follows:

| ° F.: | Inch-pounds/minute |
|---|---|
| 220 | 0.69 |
| 240 | 1.4 |
| 280 | 7.1 |
| 330 | 26.3 |
| 360 | 45.4 |

The data indicates the excellent scroch resistance obtained at processing temperatures with very rapid cures at 330° F. and above.

The utility of the vulcanizates obtained employing the present accelerator systems is evident from a consideration of the physical properties obtained for the rubber when cured at 300° F. and 360° F. The data is as follows:

| | 2 min. | 3 min. | 6 min. | 12 min. | 24 min. |
|---|---|---|---|---|---|
| 369° F. cure: | | | | | |
| Tensile, p.s.i. | 2,400 | 2,350 | 2,270 | 2,200 | 2,120 |
| Elongation percent | 830 | 850 | 840 | 920 | 790 |
| 300% modulus, p.s.i. | 660 | 610 | 610 | 600 | 590 |
| 330° F. cure: | | | | | |
| Tensile, p.s.i. | 2,100 | 2,480 | 2,510 | 2,470 | 2,480 |
| Elongation, percent | 850 | 800 | 800 | 970 | 790 |
| 300% modulus, p.s.i. | 590 | 700 | 730 | 750 | 710 |

It is obvious from the above data that a high state of cure is achieved within a very short time and that vulcanizates having excellent physical properties are obtained at both 330° F. and 360° F. without the use of elemental sulfur when the present accelerator systems are employed.

EXAMPLE III

A synthetic rubber having greater than 90% cis-1,4 content was compounded in accordance with the following recipes:

| Sample designation | O | P | Q | R |
|---|---|---|---|---|
| Synthetic cis-1,4-polyisoprene | 100 | 100 | 100 | 100 |
| HAF black | 25 | 25 | 25 | 25 |
| Steric acid | 2 | 2 | 2 | 2 |
| Zinc oxide | 3 | 3 | 3 | 3 |
| Sulfur | | 0.88 | 0.77 | |
| PYR/MDI | | 1.96 | | |
| DMA/TDI | 2.42 | | 2.42 | 18.3 |
| Polythiocarbonate | 1.76 | 1.21 | 1.21 | 1.72 |

These rubber samples were evaluated with a viscurometer having a 3° arc at 3 c.p.m. The scorch times and cure times obtained at 280° F., 300° F. and 320° F. are set forth in the table following.

|   | O | P | Q | R |
|---|---|---|---|---|
| 280° F.: | | | | |
| $T_s$ | 7.5 | 16.0 | 11.0 | 9.5 |
| $T_c$ | 31.5 | 46.5 | 32.0 | 42.0 |
| 300° F.: | | | | |
| $T_c$ | 4.5 | 7.5 | 5.5 | 4.5 |
| $T_c$ | 17.0 | 20.0 | 14.5 | 19.0 |
| 320° F.: | | | | |
| $T_s$ | 2.8 | 4.0 | 3.7 | 3.0 |
| $T_c$ | 8.5 | 10.2 | 8.5 | 8.2 |

At lower temperatures these accelerator systems became very inactive and long scorch times were obtained. For example, with sample P a scorch time of over 100 minutes was obtained at 250° F. Similar results were observed when these accelerator systems were used in natural rubber.

EXAMPLE IV

One hundred parts of an ethylene/propylene/1,4-hexadiene terpolymer (density 0.85; ML 4′@ 212° F.=80–90) was compounded with 80 parts carbon black, 40 parts naphthenic processing oil, 1 part stearic acid and 3 parts zinc oxide. Sulfur and the accelerator components were added to 100 parts of the rubber masterbatch in accordance with the following recipes:

| Sample designation | S | T | U |
|---|---|---|---|
| Sulfur | 1.02 | 1.12 | 1.12 |
| Polythiocarbonate ($n=1$) | 2.04 | 1.82 | 1.82 |
| DMA/TDI | 2.17 | | |
| PYR/MDI | | 2.28 | |
| PYR/ODI | | | 4.30 |

After addition of the sulfur and polythiocarbonate the samples were milled for 5 minutes at 150° F. before being tested in the cone curometer at 280° F. and 360° F. Results obtained at 360° F. are as follows:

|   | S | T | U |
|---|---|---|---|
| $\tau_{max}$ | 36.5 | 41.0 | 38.3 |
| $T_c$ | 6.05 | 7.45 | 9.33 |
| $T_s$ | 2.05 | 2.48 | 2.98 |
| $CR_{max}$ | 5.1 | 4.4 | 3.5 |

In addition to the superior cure rates obtained with these systems, the scorch protection achieved at lower temperatures was excellent. $CR_{max}$ for sample T at 280° F. was only 0.038 and even after maintaining this sample at 280° F. for 16 hours the torque was still increasing, i.e., the rubber was not completely cured.

EXAMPLE V

A rubber masterbatch similar to that of Example I was prepared in accordance with the following recipe:

Ingredient: Parts
Blend of styrene-butadiene and cispolybutadiene rubbers _____ 100
Aromatic oil _____ 45.4
Processing oil _____ 15.1
Carbon black _____ 85.2
Stearic acid _____ 2.0
Zinc oxide _____ 3.0
Polymeric 2,2,4-trimethyldihydroquinoline ____ 2.0
N - 1,3 - dimethylbutyl-N′-phenyl-p-phenylenediamine _____ 1.7

Two portions of this masterbatch were each compounded with 0.5 pphr. sulfur and 2.60 pphr. DMA/TDI adduct. Sample V further contained 2.48 pphr. of a polythiocarbonate with $n$ about 2.3 and sample W contained 2.48 pphr. polytrithiocarbonate ($n=1$). Samples were prepared and tested at 350° F., 330° F. and 280° F. as described in Example I with the following results:

| Sample | V | W |
|---|---|---|
| At 350° F.: | | |
| $\tau_{max}$ | 64 | 62 |
| $T_c$ | 1.74 | 1.92 |
| $T_s$ | 0.90 | 0.92 |
| $CR_{max}$ | 59.8 | 49.3 |
| At 330° F.: | | |
| $\tau_{max}$ | 56 | 55.5 |
| $T_c$ | 2.86 | 3.38 |
| $T_s$ | 1.34 | 1.40 |
| $CR_{max}$ | 32.9 | 25.8 |
| At 280° F.: | | |
| $T_s$ | 5.04 | 5.48 |
| $CR_{max}$ | 7.13 | 5.45 |

After 3 minutes cure at 330° F. Sample V had an ultimate tensile strength of 2470 p.s.i. with an ultimate elongation of 560% and a 300% modulus of 1260 p.s.i. Sample W also had excellent physical properties after only 3 minutes cure at 330° F.

We claim:

1. A composition comprising: (a) a major proportion of a rubbery polymer containing about 0.5% to 50% by weight of the olefinically unsaturated group $>\!C\!=\!C\!<$ based on the overall polymer composition; (b) a first accelerator component capable of liberating carbon disulfide during vulcanization which is a polythiocarbonate of the formula $(CS_{2+n})_x$ wherein $n$ is a number from about 0 to 5 and $x$ is a number from about 4 to about 100; and (c) a second accelerator component which is a blocked-isocyanate capable of releasing an amine or imine during vulcanization and having the formula

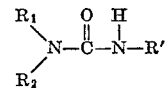

wherein R′ is an aryl group or alkyl group containing from 4 to 18 carbon atoms, said groups additionally containing isocyanate groups, blocked-isocyanate groups or other substitution, and $R_1$ and $R_2$ are monovalent hydrocarbon radicals containing from 1 to 8 carbon atoms or $R_1$ and $R_2$ jointly form a bivalent hydrocarbon radical containing 2 to 7 carbon atoms or a bivalent non-acid radical containing 2 to 8 carbon atoms with one or more oxygen, sulfur or nitrogen heteroatoms; the total combined amount of accelerator components (b) and (c) ranging between about 1 and 8 parts per 100 parts of the rubber.

2. The composition of claim 1 wherein the rubbery polymer (a) is comprised of from 30% to 100% by weight based on the overall polymer composition of conjugated diolefin containing from 4 to 6 carbon atoms.

3. The composition of claim 1 wherein the rubbery polymer (a) is an ethylene-propylene-diene terpolymer or ethylene-butene-diene terpolymer comprised of from 30 to 80 weight percent ethylene, from 0.3 to 10 weight percent diene monomer and from 20 to 70 weight percent propylene or butene-1.

4. The composition of claim 1 wherein the polythiocarbonate (b) has a value for $n$ between 1 and 3; in the blocked-isocyanate (c) $R_1$ and $R_2$ are aliphatic radicals containing from 1 to 8 carbon atoms or form a cycloalkyl group containing from 5 to 8 carbon atoms or a bivalent heterocyclic radical selected from the group pyridine, piperidine, pyrrole, 2-methylpyrrole, pyrazole, imidazole, morpholine, 1,2,3-dioxazole, 1,2,5-oxathiazole, of a dithiocarbamate accelerator at temperatures of vulcanization 2 to 5 parts (b) and (c) per 100 parts rubber are employed with the individual components present in an amount so that during the vulcanization the mol ratio of imine or amine available from (c) to the carbon disulfide available from (b) is between about 0.5:1 to 2:1.

5. The composition of claim 4 containing from 0.5 to 5 parts per 100 parts rubber of a metal salt of a fatty acid having from 12 to 24 carbon atoms or from 1 to 10 parts per 100 parts rubber of a metal oxide with 0.5 to 5 parts per 100 parts rubber of a fatty acid containing from 12 to 24 carbon atoms, said metal being selected from the group consisting of zinc, cadmium, lead, calcium, copper and iron.

6. The composition of claim 5 containing from 1.5 to 4 parts zinc oxide per 100 parts of the rubber with 0.5 to 5 parts stearic acid per 100 parts of the rubber.

7. The composition of claim 6 wherein the blocked-isocyanate (c) is an adduct formed from dimethyl amine or pyrrolidine with toluene diisocyanate, diphenylmethane-p,p'-diisocyanate or polymethylene polyphenyl isocyanate.

8. The composition of claim 6 wherein the polythiocarbonate (b) is polytrithiocarbonate.

9. In the vulcanization of rubber compositions containing olefinic unsaturation to obtain improved scorch properties while still being able to achieve extremely rapid cures the improvement comprising the in situ formation of a dithiocarbamate accelerator at temperature of vulcanization by admixing in the rubber, said rubber containing from 0.5% to 50% by weight of the olefinically unsaturated group $>C=C<$ based on the overall polymer composition, as a first accelerator component (1) a polythiocarbonate having the general formula $(CS_{2+n})_x$ wherein $n$ is a number from 0 to 5 and $x$ is a number from about 4 to 100 with a second accelerator component (2) capable of releasing an amine or imine at temperatures encountered during vulcanization.

10. The process of claim 9 wherein (1) is a polythiocarbonate of the formula $(CS_{2+n})_x$ wherein $n$ is a number from about 0 to 5 and $x$ is a number from about 4 to about 100, (2) is a blocked-isocyanate of the formula

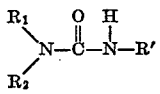

wherein R' is an aryl group or an alkyl group containing from 4 to 18 carbon atoms, said groups additionally containing isocyanate groups, blocked-isocyanate groups or other substitution, and $R_1$ and $R_2$ are monovalent hydrocarbon radicals containing from 1 to 8 carbon atoms or $R_1$ and $R_2$ jointly form a bivalent hydrocarbon radical containing 2 to 7 carbon atoms or a bivalent non-acid radical containing 2 to 8 carbon atoms with one or more oxygen, sulfur or nitrogen heteroatoms, and the total combined amounts of accelerator components (1) and (2) ranging between about 1 and 8 parts per 100 parts of the rubber.

11. The process of claim 10 wherein the rubbery polymer is selected from the group consisting of homopolymers and copolymers containing from 30% to 100% by weight based on the overall polymer composition of a conjugated diolefin containing from 4 to 6 carbon atoms and ethylene-propylene-diene or ethylene-butene-diene terpolymers comprised of from 30 to 80 weight percent ethylene, 0.3 to 10 weight percent diene monomer and from 20 to 70 weight percent propylene or butene-1.

12. The process of claim 11 wherein the polythiocarbonate has a value for $n$ between 1 and 3 and in addition to providing carbon disulfide for formation of the accelerator is the sole source of sulfur for the vulcanization.

13. The process of claim 11 wherein the rubber contains from 0.5 to 5 parts per 100 parts of the rubber, of a metal salt of a fatty acid containing from 12 to 24 carbon atoms or from 1 to 10 parts per 100 parts rubber of a metal oxide with 0.5 to 5 parts per 100 parts rubber of a fatty acid containing from 12 to 24 carbon atoms, said metal being selected from the group consisting of zinc, cadmium, lead, calcium, copper and iron.

14. The process of claim 11 wherein the polythiocarbonate (1) has a value for $n$ between 1 and 3; $R_1$ and $R_2$ for the blocked-isocyanate (2) are aliphatic radicals containing from 1 to 8 carbon atoms or form a cycloalkyl group containing from 5 to 8 carbon atoms or a bivalent heterocyclic radical selected from the group pyridine, piperidine, pyrrole, 2-methylpyrrole, pyrazole, imidazole, morpholine, 1,2,3-dioxazole, 1,2,5-oxathiazole, o-isoxazine, p-isoxazine, azepine and indole; and the combined amount of (1) and (2) will range from 2 to 5 parts per 100 parts of the rubber with the individual accelerator components present in an amount so that during the vulcanization the mol ratio of imine or amine available from (2) to the carbon disulfide available from (1) is between about 0.5:1 to 2:1.

15. The process of claim 12 wherein the rubber contains from 0.5 to 5 parts per 100 parts rubber of a metal salt of a fatty acid having from 12 to 24 carbon atoms or from 1 to 10 parts per 100 parts rubber of a metal oxide with 0.5 to 5 parts per 100 parts rubber of a fatty acid containing from 12 to 24 carbon atoms, said metal being selected from the group consisting of zinc, cadmium, lead, calcium, copper and iron.

16. The process of claim 15 wherein the rubber contains from 1.5 to 4 parts zinc oxide per 100 parts of the rubber with 0.5 to 5 parts stearic acid per 100 parts of the rubber.

17. The process of claim 16 wherein the blocked-isocyanate (2) is an adduct formed from dimethyl amine or pyrrolidine with toluene diisocyanate, diphenylmethane-p,p'-diisocyanate or polymethylene polyphenyl isocyanate.

18. The process of claim 16 wherein the polythiocarbonate (1) is polytrithiocarbonate.

References Cited
UNITED STATES PATENTS

| | | | |
|---|---|---|---|
| 1,904,573 | 4/1933 | Tuley | 260—794 |
| 2,480,814 | 8/1949 | Punshon | 260—794 |
| 1,532,225 | 4/1925 | Cadwell | 260—793 |
| 3,329,650 | 7/1967 | Albin et al. | 260—41.5 |
| 2,788,338 | 4/1957 | Zerbe | 260—79.5 X |
| 3,197,446 | 7/1965 | Ziarnik | 260—79.5 |

DONALD E. CZAJA, Primary Examiner

D. J. BARRACK, Assistant Examiner

U.S. Cl. X.R.

260—23.7 M, 79.5 B, 775, 793, 794

UNITED STATES PATENT OFFICE
CERTIFICATE OF CORRECTION

Patent No. 3,692,719　　　　　　　　Dated September 19, 1972

Inventor(s) Raymond C. Srail and Ray D. Taylor

It is certified that error appears in the above-identified patent and that said Letters Patent are hereby corrected as shown below:

Columns 9 and 10, Table I, Sample C, "(2.12)" should read --(3.12)--; Column 9, line 56, "scroch" should read --scorch--; line 59, "temepra-" should read --tempera- --; line 68, "scroch" should read --scorch--.

Column 10, in the first table, "369°F. cure" should read --360°F. cure--; in the table under "12 min.", "920" should read --820-- and "970" should read --790--; Column 10, in the table in Example III, Sample R, "18.3" should read --1.83--.

Column 12, line 67, Claim 4, delete "of a dithiocarbamate accelerator at temperatures of vul-" and insert therefor --o-isoxazine, p-isoxazine, azepine and indole; and from--.

Signed and sealed this 7th day of May 1974.

(SEAL)
Attest:

EDWARD M. FLETCHER, JR.　　　　　　　C. MARSHALL DANN
Attesting Officer　　　　　　　　　　Commissioner of Patents